(12) United States Patent
Kormann et al.

(10) Patent No.: US 7,976,998 B2
(45) Date of Patent: Jul. 12, 2011

(54) APPARATUS FOR THE DEIONIZATION OF COOLING MEDIA FOR FUEL CELLS

(75) Inventors: Claudius Kormann, Schifferstadt (DE); Andreas Fischer, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1084 days.

(21) Appl. No.: 11/802,476

(22) Filed: May 23, 2007

(65) Prior Publication Data
US 2007/0259237 A1    Nov. 8, 2007

Related U.S. Application Data

(62) Division of application No. 10/466,562, filed as application No. PCT/EP02/01074 on Feb. 1, 2002, now Pat. No. 7,235,319.

(30) Foreign Application Priority Data

Feb. 2, 2001    (DE) .................................. 101 04 771

(51) Int. Cl.
    *H01M 8/04*    (2006.01)
(52) U.S. Cl. ......................... 429/432; 429/436; 429/437
(58) Field of Classification Search .................. 429/432, 429/434, 436, 437
    See application file for complete search history.

(56) References Cited

U.S. PATENT DOCUMENTS

| | | | |
|---|---|---|---|
| 4,632,745 A | 12/1986 | Giuffrida et al. |
| 5,425,858 A | 6/1995 | Farmer |
| 5,980,716 A | 11/1999 | Horinouchi et al. |
| 6,013,385 A | 1/2000 | DuBose |
| 6,723,460 B2 | 4/2004 | Derflinger et al. |
| 6,855,445 B2 | 2/2005 | Mueller et al. |
| 2002/0025466 A1 | 2/2002 | Mueller et al. |

FOREIGN PATENT DOCUMENTS

| | | |
|---|---|---|
| EP | 1 407 506 B1 | 4/2004 |
| JP | 61-107906 | 5/1986 |
| JP | 5-029015 | 2/1993 |
| JP | 9-161833 | 6/1997 |
| JP | 2001-236981 | 4/2001 |
| WO | WO 00/17951 | 3/2000 |

*Primary Examiner* — Tracy Dove
(74) *Attorney, Agent, or Firm* — Nixon & Vanderhye P.C.

(57) ABSTRACT

The present invention relates to a process for the deionization of a cooling medium in a fuel cell (11) circulating in a cooling circuit (20), in which the cooling medium is subjected to at least intermittent, but preferably continuous, electrochemical deionization. To this end, at least one electrode deionization cell (23), through which a diluate stream (27) serving as cooling medium and a concentrate stream (28) flow, is arranged in the cooling circuit. The concentrate stream (28) may be part of a secondary cooling circuit.

5 Claims, 3 Drawing Sheets

APPARATUS FOR THE DEIONIZATION OF COOLING MEDIA FOR FUEL CELLS

This application is a divisional of commonly owned U.S. application Ser. No. 10/466,562, filed on Jul. 17, 2003 (now U.S. Pat. No. 7,235,319) which in turn is the U.S. national phase of International Application PCT/EP02/01074 filed Feb. 1, 2002 which designated the U.S., each application being hereby incorporated in its entirety by reference.

The present invention relates to a process for the deionization of cooling media for fuel cells, and to an apparatus for carrying out the process.

Fuel cells are devices in which a fuel, for example methanol, ethanol, hydrogen or corresponding mixtures, can be burnt in a controlled manner using a combustion medium, for example pure oxygen, air, chlorine or bromine gas, with the reaction energy liberated in the process being converted not only into thermal energy, but also into electrical energy. Fuel cells have been employed for several decades for producing electrical energy, in particular in space travel. Owing to their high efficiency, their low or zero emission of pollutants and their low production of noise during operation, the interest in the use of fuel cells in other areas too has increased greatly in recent years. Particular mention should be made here of the motor vehicle and power station sectors.

Fuel cells are typically classified by the nature of the electrolyte which separates the anode and cathode chambers. A particularly interesting type of fuel cell which particularly suitable for use in relatively small power stations and for mobile use (for example as vehicle drive) is the polymer electrolyte fuel cell. In this type of fuel cell, an ion-conducting membrane is used as electrolyte. A single solid-polymer fuel cell generally comprises a so-called membrane electrode assembly (MEA), in which an ion-conductive membrane is arranged between a cathode and an anode. The ion-conductive membrane here serves simultaneously as dividing wall and as electrolyte. Catalyst particles which promote the conversion reaction in the fuel cell are arranged at the interface between the electrodes and the membrane. The electrodes are typically in contact with porous current collectors, which in addition stabilize the electrode structure and allow the supply of fuel and combustion medium. Since the operating voltage of a single cell is normally less than 1 volt, most fuel cells consist of a cell stack in which, in order to produce a higher voltage, a number of individual cells stacked one on top of the other are connected in series. The typical operating temperature of a polymer electrolyte fuel cell is in the region of 100° C. Higher temperatures can result in damage to the membrane. Since the electrochemical reaction between the fuel and the combustion media proceeds exo-thermically, the fuel cell normally has to be cooled so that the desired operating temperature can be maintained. Since a relatively large amount of heat has to be dissipated with only a small temperature difference to the ambient temperature, liquid coolants of sufficiently high thermal capacity are typically employed. Water-based coolants are therefore particularly suitable.

However, water-based coolants have the disadvantage that they may contribute to corrosion in the metallic constituents of the coolant circuit and of the fuel cell. In addition, a cooling medium which has a certain electrical conductivity represents a safety problem in the fuel cell stacks which are operated at relatively high voltage, for example at about 50 volts.

Since the electrical conductivity of an aqueous cooling medium likewise drops with decreasing ion concentration, it has already been proposed to use deionized cooling media for fuel cells. For example, U.S. Pat. No. 5,200,278 and WO 00/17951 disclose arranging ion exchangers in the cooling circuit in order that the aqueous coolant remains substantially free from ionic impurities for a certain period. If deionized water is used as the coolant, this can simultaneously be used for moistening the reaction participants flowing into the fuel cell in order to ensure adequate hydration of the polymer membrane. However, a disadvantage of the known systems is that the ion exchanger becomes exhausted after a certain operating time and has to be replaced. This is consequently associated with a high maintenance requirement and high costs.

It is an object of the present invention to provide a process for the deionization of the cooling medium for a fuel cell which enables substantially maintenance-free operation and avoids shut-down of the fuel cell caused by exhaustion of the ion exchanger.

We have found that this object is achieved by the process for the deionization of a cooling medium in a fuel cell as claimed in the present claim 1. It is proposed in accordance with the invention that the cooling medium circulating in a first cooling circuit be subjected to at least intermittent electrochemical deionization. With the process according to the invention, the cooling circuit in the fuel cell operates with virtually no maintenance. As soon as, for example, a conductivity sensor records an increase in the conductivity of the cooling medium, which corresponds to an increase in the ion concentration, voltage can be applied to the electrodes of an electrochemical cell arranged in the cooling circuit, which removes some of the ions from the cooling circuit. Use is preferably made of electrodialysis cells, which can be operated with or without ion exchangers. If ion exchangers are used, the corresponding cells are also known as electro-deionization cells. In cells of this type, the deionization of the medium and the regeneration of the ion exchangers take place at the same time.

One or more heat exchangers are arranged in the cooling circuit. According to a variant of the invention, the first cooling circuit is at the same time the only cooling circuit, and the heat exchanger or exchangers is (are) in contact, for example, with air or water or another suitable cooling medium. However, the first cooling circuit may also, as primary circuit, be in thermal contact with a second circuit (secondary circuit).

According to a preferred embodiment of the process according to the invention, the deionization of the cooling medium is carried out continuously during operation of the fuel cell.

Since lower residual conductivities of the cooling medium can be achieved on use of ion exchangers than in the case of pure electrodialysis, use is preferably made of electro-deionization cells, and the cooling medium is passed through the cell as diluate stream. Electro-deionization cells are known per se and are used, for example, for the desalination of sea water. An electro-deionization cell of this type may consist, for example, of a mixed bed of anion and cation exchanger resins. According to another variant, anion and cation exchanger resins are arranged in two separate chambers. The diluate flows through the ion exchanger packs, which are separated from the concentrate stream by ion-selective membranes.

The diluate stream is advantageously cooled before the deionization in order to keep the temperature of the solutions in contact with the ion exchanger components low. To this end, the electro-deionization cell may, for example, be arranged downstream (based on the flow directions of the diluate) of the coolers or heat exchangers in the first cooling circuit.

According to a particularly preferred variant, the first cooling circuit is designed as primary cooling circuit, with the depleted diluate stream coming into contact with the corrosion-endangered components. The concentrate stream from the electro-deionization cell can then be allowed to circulate in a second cooling circuit, the secondary cooling circuit, and cooled in a primary heat exchanger. The cooled concentrate stream can subsequently be used for cooling the diluate stream. The secondary circuit of the concentrate stream can have a water supply with which the water losses occurring in operation during regeneration of the ion exchangers can be compensated. In this variant, the heat from the diluate stream, after leaving the fuel cell, is preferably transferred to the secondary circuit containing the concentrate stream via a primary cooler. The cooled diluate stream subsequently passes through the electro-deionization cell. The heated concentrate stream is passed through the primary cooler and subsequently into the electro-deionization cell, where it takes up the ions migrating out of the diluate.

The ionic conductivities which can be achieved in the depleted diluate stream by means of the process according to the invention are, depending on the initial conductivity, usually less than 1 µS/cm. It is even possible to achieve conductivities of less than 0.1 µS/cm.

The present invention thus relates in its most general form to the use of an electro-deionization cell for the deionization of the cooling medium in a fuel cell The present invention also relates to a fuel cell unit having at least one fuel cell and a first cooling circuit for the fuel cell, wherein at least one electro-deionization cell, through which a diluate stream serving as cooling medium and a concentrate stream flow, is arranged in the cooling circuit. It is possible to use a very wide variety of electrode ionization cells known per se (cf., for example, Ganzi et al. "Electrodeionization", Ultrapure Water, July/-August 1997).

The electrodes of the electro-deionization cells can be made of suitable materials, for example noble metals, in particular platinum, metal oxides or graphite. The cathodes may also consist, for example, of steel or nickel. The separation between the membranes is usually from several hundred pm to a few cm. The current densities are dependent on the residual conductivities of the solutions and can be from a few $mA/m^2$ to several $A/m^2$. In the case of continuous operation, the energy requirement of an electro-deionization cell of this type is less than one watt per liter of solution.

According to a variant of the invention, the chambers of the electro-deionization cell do not contain ion exchanger packing. In this case, the cell is operated as a pure electrodialysis cell. However, the achievable residual conductivities are greater than in the case of a comparable electro-deionization cell containing ion exchanger packing.

However, ion exchanger packing is particularly preferably provided. The ion exchanger may consist, for example, of a mixed bed of anion and cation exchanger resins which is delimited on the cathode side by a cation exchanger membrane and on the anode side by an anion exchanger membrane. The diluate stream to be depleted flows through the packing. The ion exchanger membranes are in contact on the side opposite the ion exchanger bed with the concentrate stream, which is at the same time in contact with the electrodes, between which the electric field is built up. This variant offers the possibility of constructing a number of diluate and concentrate chambers alternately in order to facilitate greater volume throughput for the same electrode surface area.

According to another variant, the diluate flows through the cation exchanger resin and anion exchanger resin in two separate chambers. The cation exchanger resin packing here is delimited on the one hand from the concentrate stream by a cation exchanger membrane and on the other hand from the anion exchanger resin packing by a so-called bipolar membrane. At the bipolar membrane, protons are liberated on the side of the cation exchanger resin packing and hydroxyl ions on the side of the anion exchanger resin packing. The anion exchanger resin packing is itself delimited from the concentrate stream by an anion exchanger membrane.

The concentrate stream preferably flows around the electrodes of the electro-deionization cell. If constituents of the concentrate stream are sensitive to electrode reactions, the electrodes can, for example, be screened by a simple ion-selective membrane in order that anodically or cathodically unstable components may also be present in the concentrate stream. Thus, for example, glycols can be added as antifreeze component. The cooling medium may also comprise additional corrosion inhibitors, for example the orthosilicates described in the patent application DE-A 100 63 951. The orthosilicates preferably have four identical alkoxide substituents, in the form tetra(alkoxy)silane. Typical examples of suitable silicates are pure tetra-alkoxysilanes, such as tetramethoxysilane, tetraethoxy-silane, tetra(n-propoxy)silane, tetra(isopropoxy)-silane, tetra(n-butoxy)silane, tetra(tert-butoxy)-silane, tetra(2-ethylbutoxy)silane, tetra(2-ethyl-hexoxy)silane or tetra[2-[2-(2-methoxyethoxy) ethoxy]-ethoxy] silane. Said substances are either commercially available or can be prepared by simple transesterification of one equivalent of tetramethoxysilane with four equivalents of the corresponding relatively long-chain alcohol or phenol by removal of methanol by distillation.

Particularly suitable cation exchanger membranes are perfluorinated membranes, for example Nafion®117, which is made by Dupont. Water diffusing through the membranes is decomposed to form hydrogen and oxygen by application of an electric voltage to the gas-evolving electrodes. According to a further variant, use can also be made of gas diffusion electrodes which convert hydrogen fed to the anode side into protons and reduce oxygen on the cathode side into water. In a variant of this type, the electrode/membrane unit may be directly adjacent to the diluate stream.

The present invention is explained in greater detail below with reference to illustrative embodiments shown in the attached drawings, in which.

Figure 1:
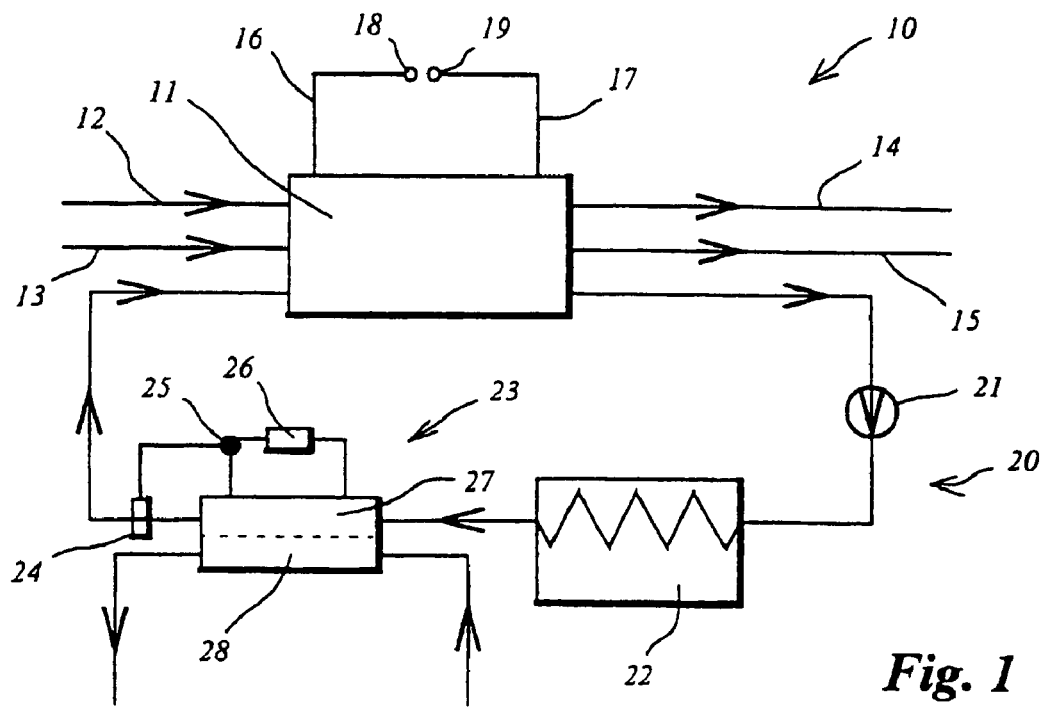
FIG. 1 shows a diagrammatic representation of a first illustrative embodiment of a fuel cell unit according to the invention having a cooling circuit in which an electro-deionization cell is arranged.

FIG. 1 shows a diagrammatic view of a fuel cell unit 10 according to the invention. The fuel cell unit 10 comprises a fuel cell stack 11, which has feed lines for the fuel 12, for example hydrogen gas, and feed lines for the combustion medium 13, for example air or oxygen. In the case of feed of gaseous substances, at least one of the supplied gases is moistened before introduction into the fuel cell stack 11 in order to prevent the polymer membranes from drying out. The reaction products are able to leave the fuel cell stack 11 via outlet lines 14, 15. If the fuel cell is operated with pure hydrogen and oxygen, the reaction product formed is water, which can be used partly for moistening the gases flowing in via lines 12 and 13. In the case of the variant shown in FIG. 5 with secondary cooling circuit, another part of the water formed can also be used for compensation of the water losses which occur in the secondary cooling circuit, as described in greater detail below. The current generated by the fuel cell stack 11 can be fed via collecting lines 16, 17 to positive or negative connecting terminals 18, 19.

The fuel cell unit 10 has a first cooling circuit, which is designated overall with the reference number 20. The coolant used can be, for example, water, which, depending on the area of application, may contain further auxiliaries, for example antifreeze agents or corrosion inhibitors. A circulation pump 21 which effects transport of the cooling medium is arranged in the cooling circuit. Cooling medium is transported through a heat exchanger 22, which is in thermal contact, for example, with ambient air. However, thermal contact with a second cooling circuit may also be implemented, as described in connection with FIG. 5. An electro-deionization cell 23, which reduces the ion concentration in the cooling circuit 20, is arranged downstream of the heat exchanger 22 in the fuel cell unit according to the invention. The electro-deionization cell 23 can be operated intermittently. For example, a conductivity sensor 24, which switches, via a switch 25, a direct voltage supplied by a voltage source 26 onto the electrodes of the electro-deionization cell, can be arranged in the cooling circuit 20.

The cooling medium of the cooling circuit 20 flows as a so-called diluate stream 27 through the electro-deionization cell 23. Ions are depleted in the diluate stream 27 and enriched in a concentrate stream 28, likewise passed through the cell 23. A particular advantage of the electro-deionization cell is that in operation, regeneration of the ion exchangers, which is preferably arranged in the cell, takes place at the same time as the deionization of the diluate. Exhaustion of the ion exchanger, as occurs, for example, in the process described in WO 00/17951, is avoided in the case of the use proposed in accordance with the invention of an electro-deionization cell for the deionization. The energy expenditure necessary for desalination and regeneration is relatively low, which means that the cell can also advantageously be operated continuously. Depending on the input conductivity of the coolant, initial conductivities of less than 1 .mu.S/cm and even down to 0.1 .mu.S/cm can be achieved with a power of less than one watt per liter of solution (for comparison, it should be noted that the minimum achievable residual conductivity at the dissociation equilibrium of pure water is about 0.05 .mu.S/cm).

A very wide variety of electro-deionization cells known per se can be employed in the process according to the invention. The mode of functioning of an electro-deionization cell and typical illustrative embodiments of cells of this type are described briefly below with reference to FIGS. 2 to 4.

In principle, an electro-deionization cell consists of a membrane stack in which anion- and cation-permeable ion exchanger membranes are arranged alternately. Parallel flow channels between the membranes are formed by spacers. Every second channel is filled with ion exchanger resin in tight packing. The diluate to be depleted flows through the ion exchanger packing, while the concentrate, in which the concentration of the ions removed from the diluate is increased, is passed into channels in between. The membrane stack is delimited by a pair of electrodes, across which a direct-voltage field is applied transversely.

Figure 2:
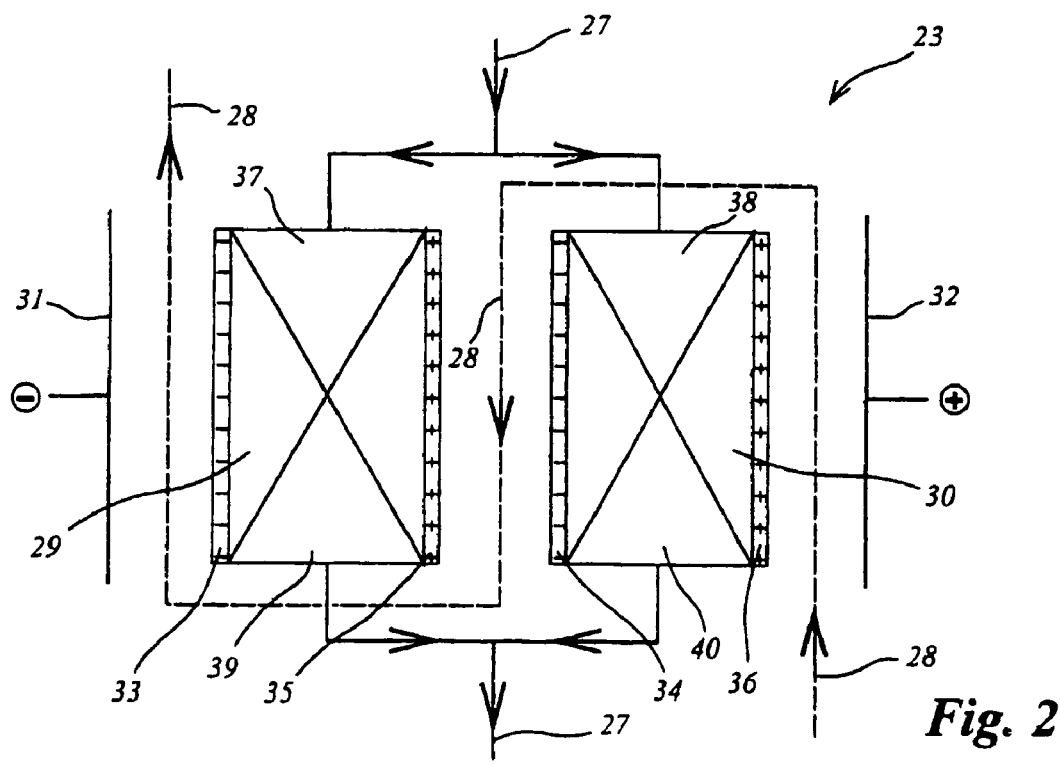
FIG. 2 shows a detailed representation of the electro-deionization cell from FIG. 1, in which the ion exchanger is in the form of mixed bed packing.

In the embodiment shown in FIG. 2, the diluate 27 is passed through a plurality of channels 29, 30, each of which is filled with a mixed bed of anion and cation exchanger resins. The membrane stack is delimited by a cathode 31 and an anode 32. The ion exchanger packing is delimited on the cathode side by a cation exchanger membrane 33, 34 and on the anode side by an anion exchanger membrane 35, 36. The concentrate stream 28 is passed between the individual diluate channels 29, 30. Under the influence of the electric field, the ions are transferred from the diluate channel into the concentrate channel via the ion exchanger resin and the membranes. The alternating structure of diluate and concentrate channels enables a greater volume throughput to be achieved for a given electrode surface area. In the entry region 37, 38 of the diluate into the channels 29, 30, cations are transferred into the concentrate channel 28 via the cation-permeable membrane 33, 34 and anions via the anion-permeable membrane 35, 36. By contrast, dissociation of water occurs to an increased extent in the outlet region 39, 40, the protons and hydroxyl ions formed converting the ion exchangers into the H+ and OH−. form respectively. The ions liberated in the inlet region are transported further over the resin surface, ensuring regeneration of the ion exchanger resins at the same time as the deionization.

Figure 3:
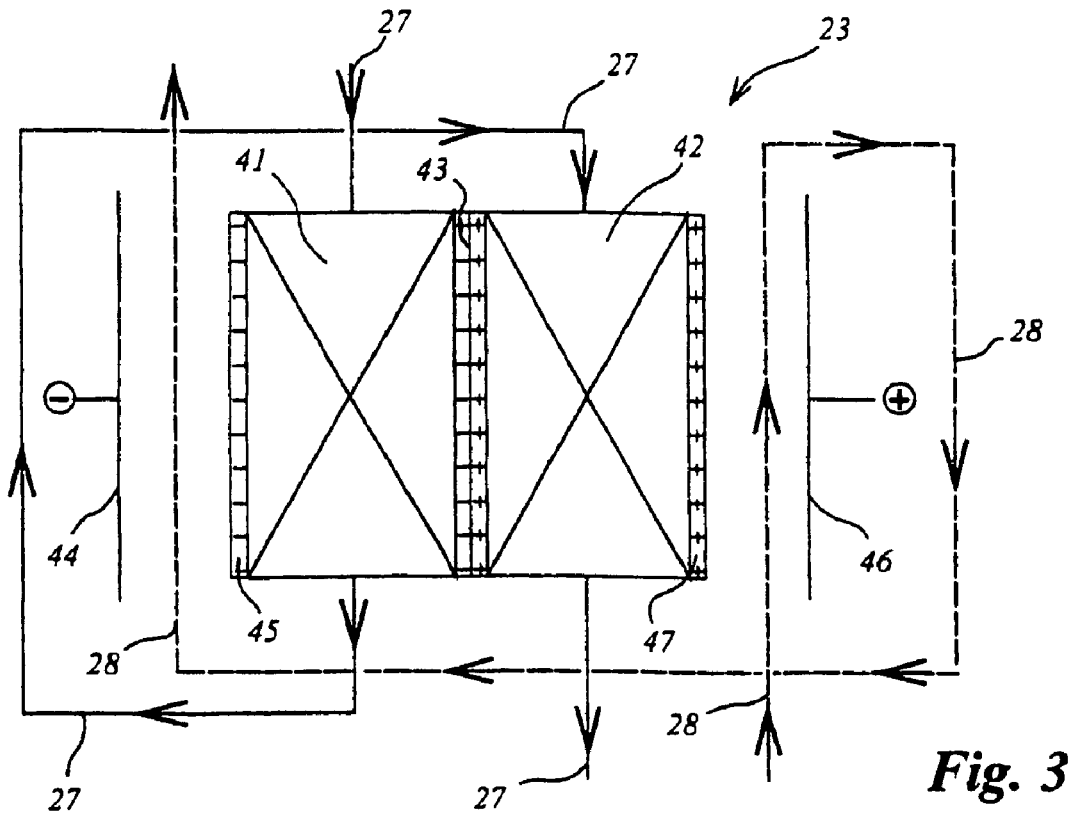
FIG. 3 shows a variant of FIG. 2, in which the ion exchanger has separate chambers for anion and cation exchanger resins.

The variant of the electro-deionization cell 23 shown in FIG. 3 does not contain a mixed bed, in contrast to the variant in FIG. 2, but instead the cooling medium for the fuel cell is, as diluate 27, passed firstly through a cation exchanger resin packing 41 and subsequently through an anion exchanger resin packing 42. In the example shown, the packings 41 and 42 are in the form of a double layer and are separated from one another by a so-called bipolar membrane 43. At the bipolar membrane 43, protons are liberated on the side of the cation exchanger resin packing 41 and hydroxyl ions are liberated on the side of the anion exchanger resin packing 42. The cation exchanger resin 41 is delimited on the side of the cathode 44 by a cation-permeable membrane 45, while the anion exchanger resin packing 42 is delimited on the side of the anode 46 by an anion-permeable membrane 47. The concentrate 28 accordingly flows around the resin double layer only on its upper and lower sides.

In the examples shown, the electrodes can be screened against the concentrate solution by suitable membranes, so that anodically and cathodically unstable components may also be present in the concentrate stream. The cathode can be screened, for example, by an anion-permeable membrane and the anode by a cation-permeable membrane. The process according to the invention and the apparatus according to the invention are therefore particularly suitable for the deionization of coolants of fuel cells to which, owing to their area of application, antifreeze agents have to be added. Thus, the invention is particularly suitable for applications in the automobile sector, since, for example, water/-glycol mixtures can be used as coolant.

Water diffusing through the membranes is decomposed into hydrogen and oxygen by application of an electric voltage to the gas-evolving electrodes.

Figure 4:
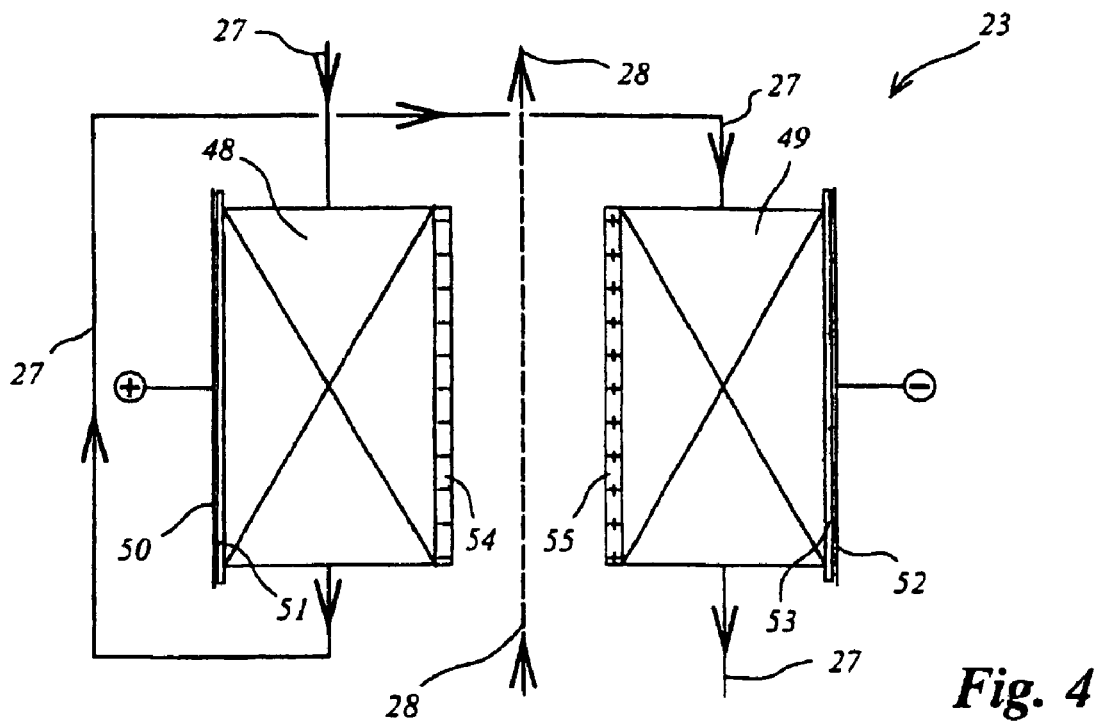
FIG. 4 shows a further variant of FIG. 2, in which a membrane electrode unit is provided.

A separate cation exchanger packing 48 and anion exchanger packing 49 are again used in the illustrative embodiment in FIG. 4. The electrodes are designed as a membrane/electrode unit. Thus, the anode 50 lies directly against the cation exchanger packing 48 with a cation-permeable membrane 51 inserted in between, while the cathode 52 with an anion-permeable membrane 53 lies against the anion exchanger packing 49. The concentrate stream 28 is transported in a channel between the packings 48 and 49 and is delimited by a cation-permeable membrane 54 and an anion-permeable membrane 55 respectively.

The electrodes may be designed as gas diffusion electrodes.

Figure 5:
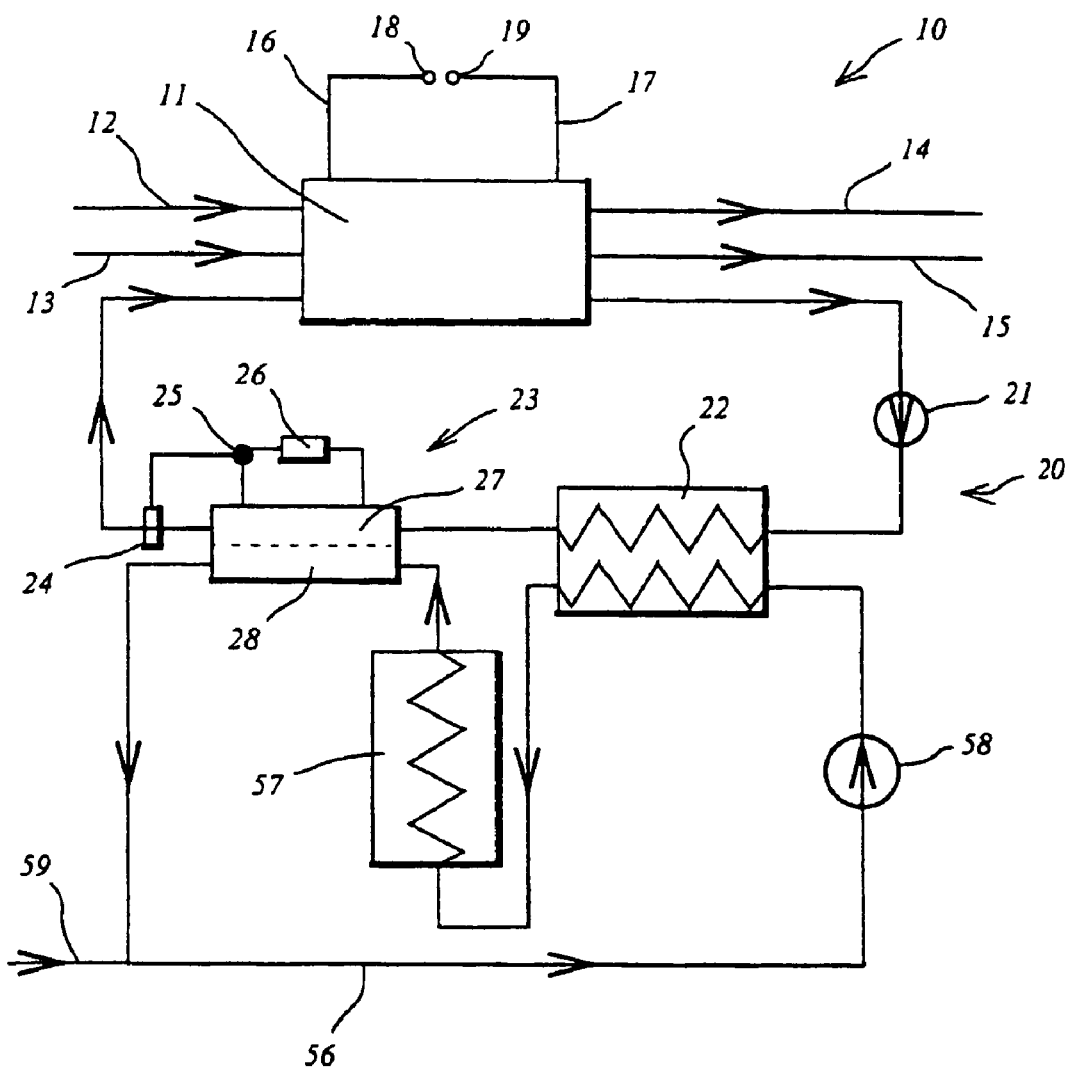
FIG. 5 shows a diagrammatic representation of a second illustrative embodiment of a fuel cell unit according to the invention, in which the concentrate stream forms a secondary cooling circuit.

Finally, FIG. 5 shows a variant of the fuel cell unit 10 in FIG. 1, in which the concentrate stream 28 serves as secondary cooling circuit 56. The components which have already been described in connection with the variant in FIG. 1 are denoted by the same reference numerals and are not explained in greater detail here. The concentrate stream 28 takes up heat from the diluate stream 27 in the heat exchanger 22. The cooled diluate stream 27 is fed to the electro-deionization cell 23. The warmed concentrate stream is passed firstly through a primary cooler 57 and, after cooling, is likewise fed to the electro-deionization cell. A conveying pump 58 is arranged in the secondary cooling circuit 56. Water losses in the secondary cooling circuit 56 can be replaced as needed via line 59. If the fuel cell is fed with pure hydrogen and oxygen, some of the water formed as reaction product can be fed into the secondary cooling circuit 56 from lines 14, 15 via line 59.

We claim:

1. A fuel cell assembly comprising:
   at least one fuel cell, and
   a first cooling circuit for the fuel cell, wherein
   the first cooling circuit comprises at least one electro-deionization cell through which a diluate stream serving as cooling medium and a concentrate stream flow, wherein
   the at least one electro-deionization cell includes electrodes, and a conductivity sensor for measuring electrochemical conductivity of the cooling medium, and wherein
   the conductivity sensor switches a direct voltage supplied by a voltage source onto the electrodes of the electro-deionization cell in response to the sensor measuring an increase of the electrochemical conductivity of the cooling medium so as to subject the cooling medium to electrochemical deionization.

2. The fuel cell assembly according to claim 1, further comprising a second cooling circuit through which the concentrate stream is circulated, and a heat exchanger arranged upstream of the at least one electro-deionization cell which thermally couples the first and second cooling circuits.

3. The fuel cell assembly according to claim 1, wherein the at least one electro-deionization cell comprises a mixed bed comprising anion and cation exchanger resins through which the diluate stream flows.

4. The fuel cell assembly according to claim 1, wherein the at least one electro-deionization cell comprises a first chamber containing a cation exchanger resin, through which the diluate stream flows, and a second chamber containing an anion exchanger resin.

5. The fuel cell assembly according to claim 4, wherein the at least one electro-deionization cell comprises a bipolar membrane arranged between the first chamber and the second chamber.

* * * * *